United States Patent [19]

Fuss et al.

[11] Patent Number: 5,302,992
[45] Date of Patent: Apr. 12, 1994

[54] CAMERA WITH EXTENSIONS FOR FILM RAILS

[75] Inventors: Timothy J. Fuss, Rochester; Susan J. Metler, Holley, both of N.Y.

[73] Assignee: Eastman Kodak Company, Rochester, N.Y.

[21] Appl. No.: 92,680

[22] Filed: Jul. 16, 1993

[51] Int. Cl.$^5$ .............................................. G03B 1/00
[52] U.S. Cl. ....................................................... 354/212
[58] Field of Search ................................. 354/203, 212

[56] References Cited

U.S. PATENT DOCUMENTS

| | | | |
|---|---|---|---|
| 3,384,319 | 5/1968 | Saito et al. | 242/71.1 |
| 3,387,546 | 6/1968 | Winkler et al. | 95/31 |
| 3,463,071 | 8/1969 | Winkler et al. | 95/31 |
| 3,465,657 | 9/1969 | Welzel et al. | 354/212 |
| 3,567,147 | 3/1971 | Engelsmann et al. | 242/71.1 |
| 4,239,362 | 12/1980 | Katayama et al. | 354/212 |
| 4,482,229 | 11/1984 | Sugiura | 354/212 |
| 4,530,582 | 7/1985 | Hara et al. | 354/203 |

*Primary Examiner*—Michael L. Gellner
*Assistant Examiner*—Nicholas J. Tuccillo
*Attorney, Agent, or Firm*—Roger A. Fields

[57] ABSTRACT

A camera comprises a back frame opening for exposing successive longitudinal sections of a filmstrip, a pair of parallel film rails located adjacent opposite sides of the back frame opening for supporting successive sections of the filmstrip flat over the back frame opening, a take-up chamber for taking up the filmstrip beginning with a leading film end, and respective rail extensions to the take-up chamber abutted end to end with the film rails to effect narrow discontinuities between the rail extensions and the film rails. According to the invention, the abutted ends of the film rails and the rail extensions are inclined relative to the direction of film travel along the film rails to similarly arrange the discontinuities in order to facilitate advance of the leading film end over the discontinuities. Since the discontinuities are inclined relative to the direction of film travel, rather than located perpendicular to the direction of film travel as in the prior art, it is less likely that the leading film end can be caught at the discontinuities during film travel.

3 Claims, 4 Drawing Sheets

CAMERA WITH EXTENSIONS FOR FILM RAILS

FIELD OF THE INVENTION

This invention relates generally to the field of photography, and in particular to cameras. Specifically, the invention relates to a camera with extensions for its film rails.

BACKGROUND OF THE INVENTION

Known cameras for use with conventional 35 mm film cassettes commonly include a supply chamber for receiving the film cassette, a back frame opening for exposing successive longitudinal sections of a filmstrip removed from the cassette, a pair of parallel film rails located adjacent opposite sides of the back frame opening for supporting successive sections of the filmstrip flat over the back frame opening, and a take-up chamber with a spool or drum for taking up the filmstrip beginning with its leading film end. To guide the leading film end onto the spool, the Chinon AUTO GL camera has a pair of rail extensions to the take-up chamber. The rail extensions are abutted end to end with the film rails to effect narrow discontinuities between the rail extensions and the film rails

PROBLEM TO BE SOLVED BY THE INVENTION

In the Chinon AUTO GL camera, the abutted ends of the film rails and the rail extensions are located perpendicular to the direction of film travel along the film rails and the rail extensions. As a result, the discontinuities are similarly arranged relative to the direction of film travel. This may make it possible for the leading film end to be caught at the discontinuities during film travel along the film rails, which would prevent the leading film end from being advanced into the take-up chamber.

SUMMARY OF THE INVENTION

According to the invention, a camera comprising a back frame opening for exposing successive longitudinal sections of a filmstrip, a pair of parallel film rails located adjacent opposite sides of the back frame opening for supporting successive sections of the filmstrip flat over the back frame opening, a take-up chamber for taking up the filmstrip beginning with a leading film end, and respective rail extensions to the take-up chamber abutted end to end with the film rails to effect narrow discontinuities between the rail extensions and the film rails, is characterized in that:

the abutted ends of the film rails and the rail extensions are inclined relative to the direction of film travel along the film rails to similarly arrange the discontinuities in order to facilitate advance of the leading film end over the discontinuities.

ADVANTAGEOUS EFFECT OF THE INVENTION

Since the discontinuities are inclined relative to the direction of film travel along the film rails, rather than being located perpendicular to the direction of film travel as in the prior art, it is less likely that the leading film end can be caught at the discontinuities during film travel along the film rails.

DETAILED DESCRIPTION OF THE INVENTION

The invention is disclosed as being embodied preferably in a 35 mm still-picture camera. Because the features of this type of camera are generally known, the description which follows is directed in particular only to those elements forming part of or cooperating directly with the disclosed embodiment. It is to be understood, however, that other elements may take various forms known to a person of ordinary skill in the art.

Figure 1:
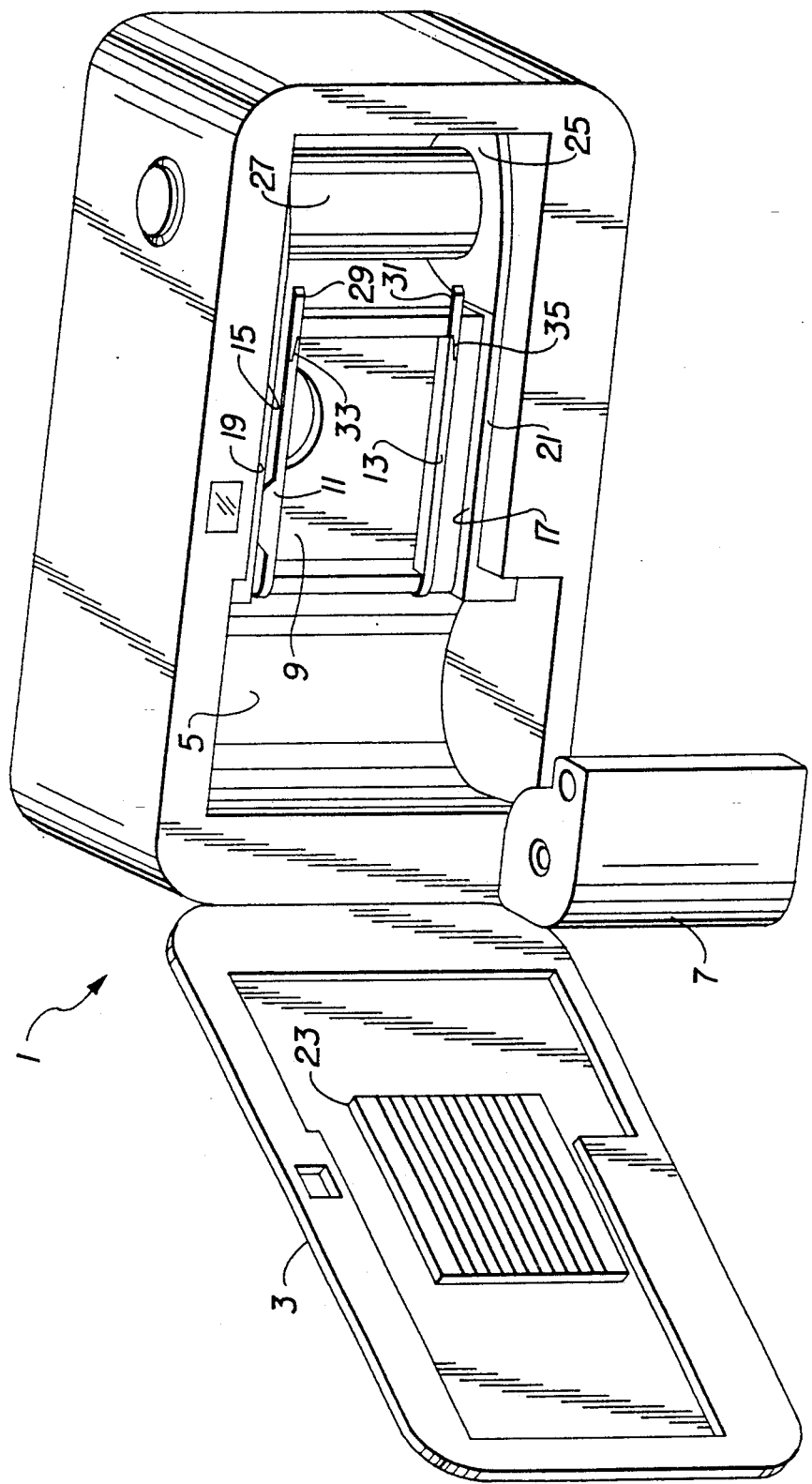
FIG. 1 is a rear perspective view of a camera according to a preferred embodiment of the invention, shown with a rear door of the camera opened to permit a film cassette to be inserted into a supply chamber of the camera.

Referring now to the drawings, FIG. 1 shows a camera 1 with its rear door 3 opened to reveal a supply chamber 5 for receiving a film cassette 7, a back frame opening 9 for exposing successive longitudinal sections of a filmstrip removed from the cassette, not shown, a pair of parallel film rails 11 and 13 located adjacent opposite sides of the back frame opening for supporting successive sections of the filmstrip flat over the back frame opening, a pair of longitudinal edge guides 15 and 17 contiguous with the film rails, a pair of platen supports 19 and 21 for a film platen 23 mounted on the inside of the rear door, and a take-up chamber 25 having a rotatable spool 27 onto which the filmstrip beginning with its leading film end is wound.

According to the invention, respective rail extensions 29 and 31 to the take-up chamber 25 are abutted end to end with the film rails 11 and 13 to effect narrow discontinuities 33 and 35 between the rail extensions and the film rails as shown in FIG. 1. The abutted ends 37 and 39 of the film rails 11 and 13 and the rail extensions 29 and 31 are inclined relative to the direction of film travel along the film rails to similarly arrange the discontinuities 33 and 35 in order to facilitate advance of the leading film end over the discontinuities. See FIG. 2. Since the discontinuities 33 and 35 are inclined relative to the direction of film travel, rather than located perpendicular to the direction of film travel as in the prior art, it is less likely that the leading film end can be caught at the discontinuities during film travel.

Alternate Embodiment

Figure 2:
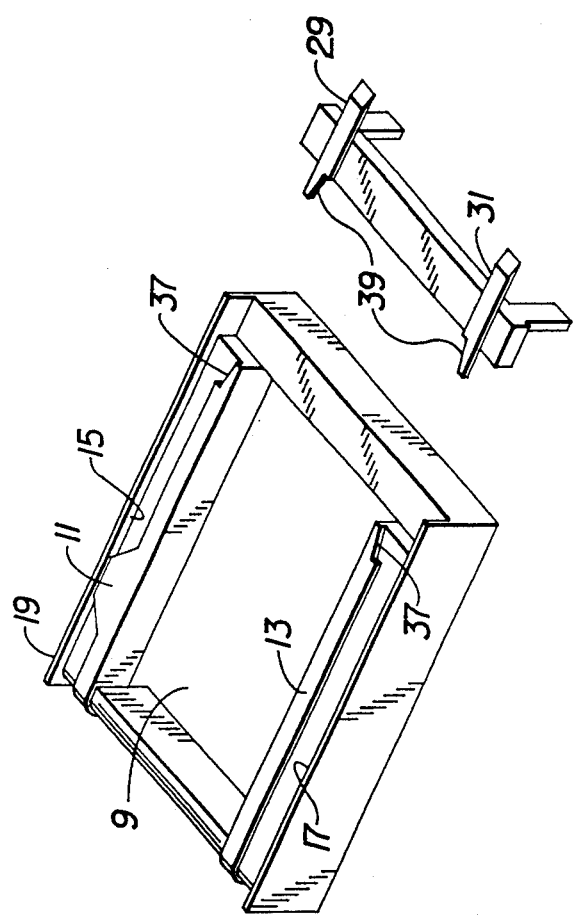
FIG. 2 is an exploded perspective view of a pair of film rails and respective rail extensions inside the camera.
Figure 3:
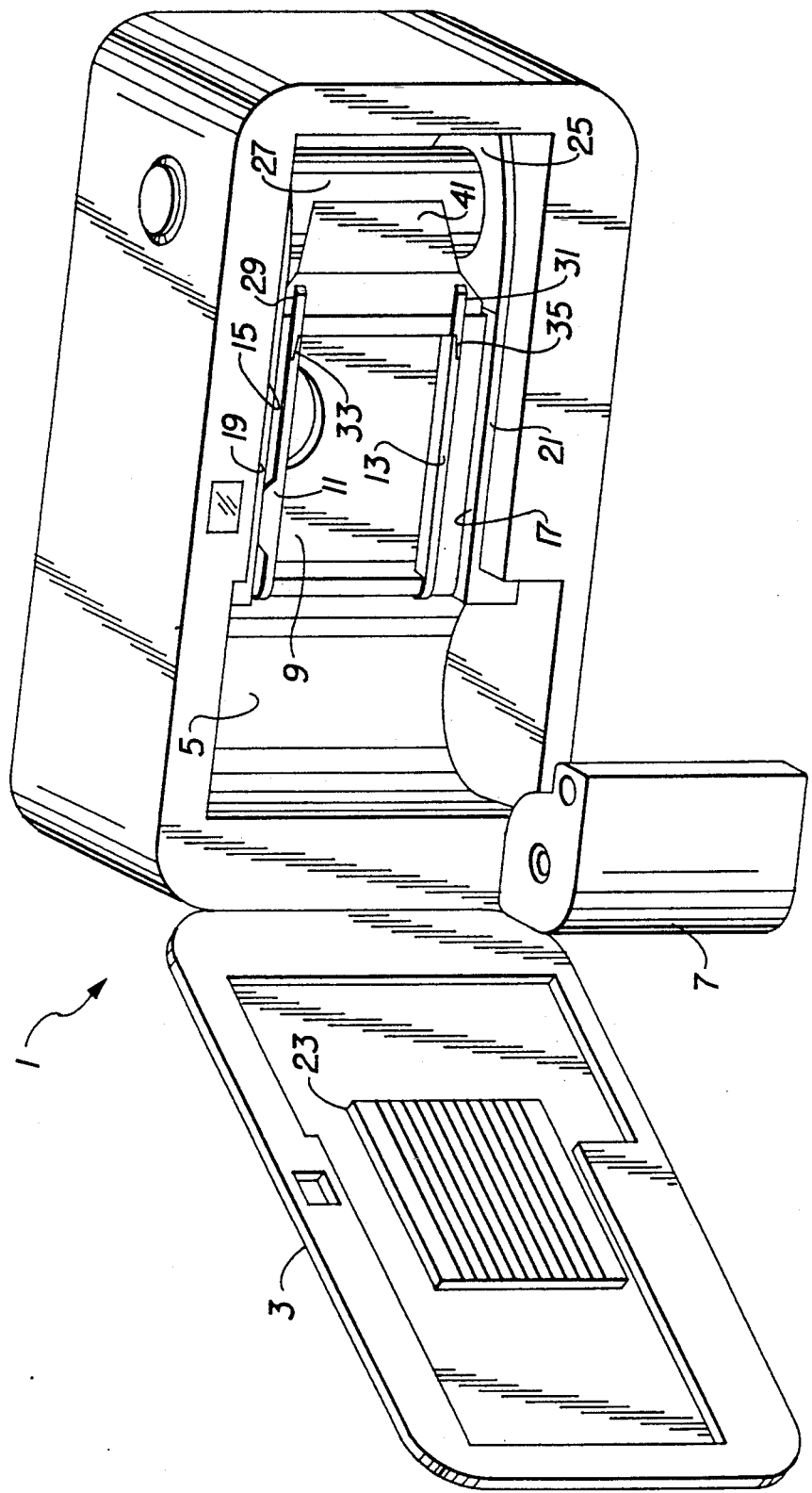
FIG. 3 is a is a rear perspective view of a camera according to an alternate embodiment of the invention, shown with a rear door of the camera opened to permit a film cassette to be inserted into a supply chamber of the camera.
Figure 4:
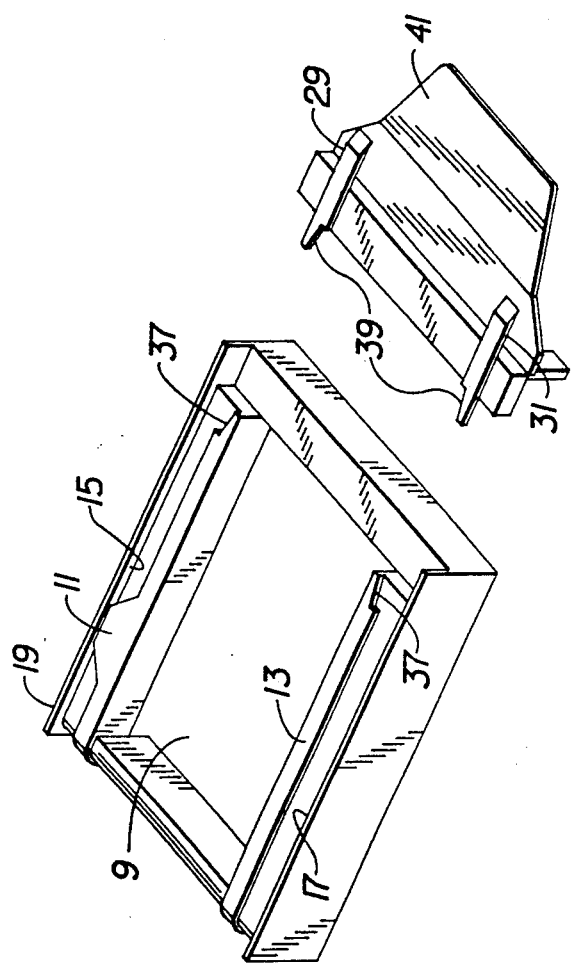
FIG. 4 is an exploded perspective view of a pair of film rails and respective rail extensions inside the camera.

FIGS. 3 and 4 are identical to FIGS. 1 and 2, with the exception that the rail extensions 29 and 31 include an integral flexible flap 41 which extends forward of the rail extensions into the take-up chamber 25.

The invention has been described with reference to a preferred embodiment. However, it will be appreciated that variations and modifications can be effected by a person of ordinary skill in the art without departing from the scope of the invention.

PARTS LIST FOR FIGS. 1-4

1. camera
3. rear door
5. supply chamber
7. film cassette
9. back frame opening
11 and 13. film rails
15 and 17. edge guides
19 and 21. platen supports
23. film platen
25. take-up chamber
27. spool
29 and 31. rail extensions
33 and 35. discontinuities
37 and 39. abutted ends
41. flap

What is claimed is:

1. A camera comprising a back frame opening for exposing successive longitudinal sections of a filmstrip, a pair of parallel film rails located adjacent opposite sides of said back frame opening for supporting successive sections of the filmstrip flat over the back frame opening, a take-up chamber for taking up the filmstrip beginning with a leading film end, and respective rail extensions to said take-up chamber abutted end to end with said film rails to effect narrow discontinuities between said rail extensions and the film rails, is characterized in that:

said abutted ends of said film rails and said rail extensions are inclined relative to the direction of film travel along the film rails to similarly arrange said discontinuities in order to facilitate advance of the leading film end over the discontinuities.

2. A camera as recited in claim 1, wherein said rail extensions include an integral flexible flap which extends forward of the rail extensions into said take-up chamber.

3. A camera as recited in claim 1, wherein said rail extensions are rigid.